United States Patent
McGovern et al.

[11] Patent Number: 5,955,674
[45] Date of Patent: Sep. 21, 1999

[54] DRIVELINE VIBRATION SYSTEM DIAGNOSTICS

[75] Inventors: Kevin M. McGovern, Canton; David S. Totten, Farmington Hills; Don K. St. John, Livonia; James M. Slicker, West Bloomfield, all of Mich.

[73] Assignee: Eaton Corporation, Cleveland, Ohio

[21] Appl. No.: 08/961,605

[22] Filed: Oct. 31, 1997

[51] Int. Cl.[6] .................................................. G01M 13/02
[52] U.S. Cl. ................................ 73/650; 73/660; 701/111
[58] Field of Search ...................... 73/650, 660; 324/166, 324/176, 174, 175; 340/683; 701/111

[56] References Cited

U.S. PATENT DOCUMENTS

| | | | |
|---|---|---|---|
| 4,317,371 | 3/1982 | Wolfinger | 73/650 |
| 5,390,545 | 2/1995 | Doan | 73/650 |
| 5,686,669 | 11/1997 | Hernandez et al. | 73/650 |
| 5,691,469 | 11/1997 | Mezger et al. | 73/117.3 |
| 5,893,042 | 4/1999 | Lohmann et al. | 701/111 |

*Primary Examiner*—John E. Chapman
*Attorney, Agent, or Firm*—Loren H. Uthoff, Jr.; Howard D. Gordon

[57] ABSTRACT

A diagnostic driveline vibration analyzing tool for measuring and characterizing the torsional vibration of a rotating component such as a transmission output shaft in a vehicle driveline. An electronic control unit and sensor cooperate to measure speed fluctuations occurring between the passing of adjacent teeth of a rotating gear. These time measurements are then filtered using an order tracked pass band filter to isolate frequencies of interest the results of which are then used to calculate a total torsional energy level by taking the root mean square of the filtered signal over a predetermined period of time. The total torsional energy level is then compared to a predetermined maximum amplitude and if the total torsional level exceeds this predetermined maximum amplitude then the operator is notified through a display device.

14 Claims, 3 Drawing Sheets

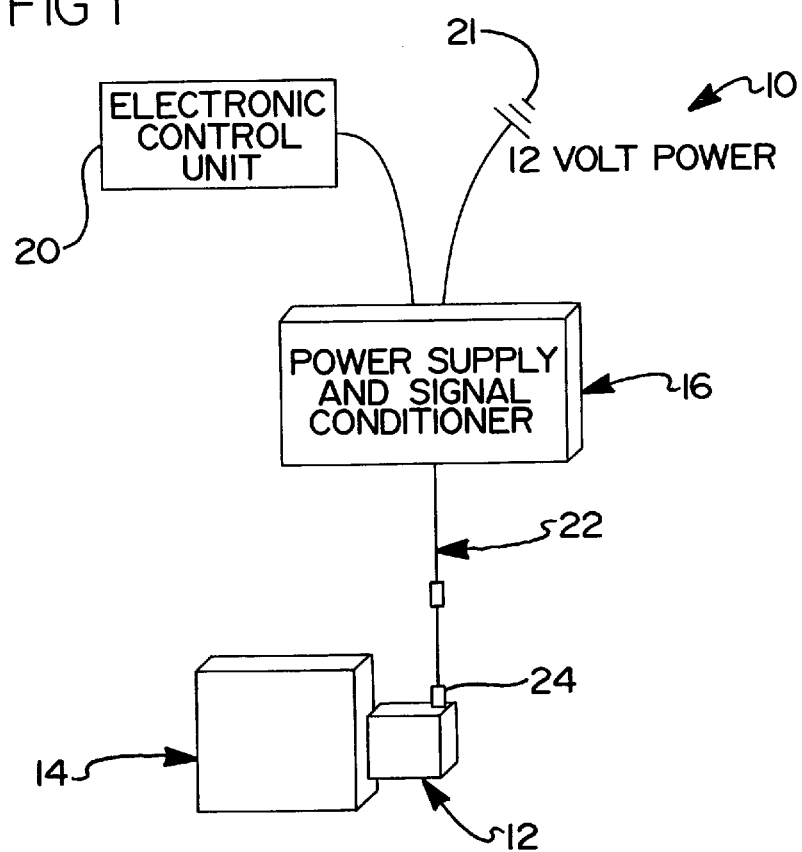
FIG 1
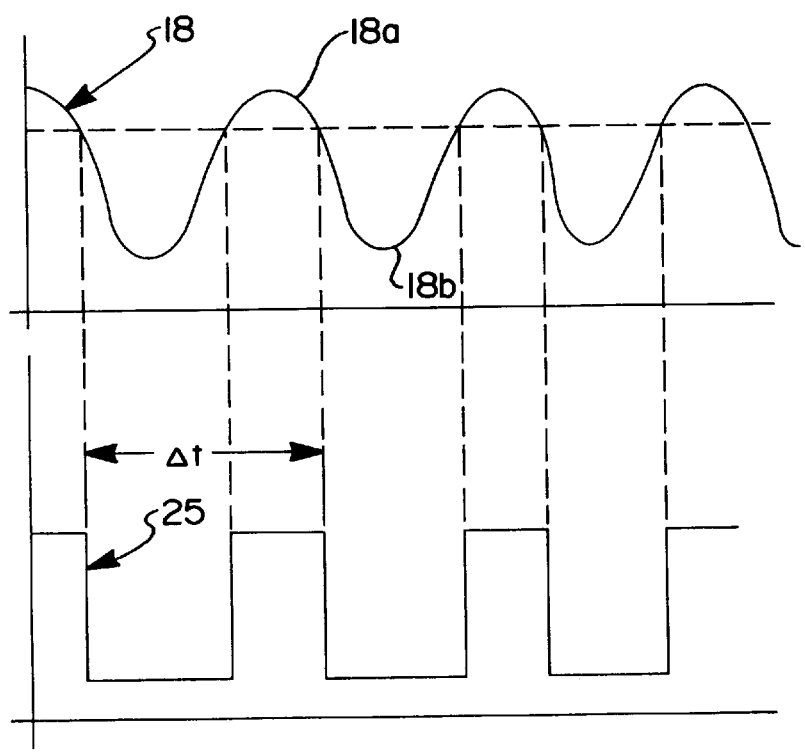
FIG 2
FIG 3

DRIVELINE VIBRATION SYSTEM DIAGNOSTICS

RELATED APPLICATIONS

The present application is related to application U.S. Ser. No. 08/650,565 entitled "Driveline Vibration Analyzer" which is a continuation of application U.S. Ser. No. 08/335,275 now abandoned and assigned to the same assignee as this application.

BACKGROUND AND SUMMARY OF THE INVENTION

This invention relates generally to vehicle diagnostic equipment and, more particularly, to an on-board driveline vibration diagnostic system for identifying, analyzing and responding to excessive vehicle torsional vibrations.

Driveline torsional vibration problems are a significant cause of premature driveline component failures, especially in heavy duty vehicles such as trucks. These torsionals originate from a variety of sources, the most common being U-joints at non-zero working angles and engine torsionals, and may be non-resonant or can excite driveline torsional modes. Depending upon the source and characteristics of the vibration, it may go unnoticed until one or more driveline components fail.

Even if the vibration causes excessive noise or vehicle vibration, it is often difficult to pinpoint the cause of the vibration. The problem is commonly addressed by swapping driveline components until the problem disappears, even when the problem is not in fact driveline related. Damaged driveline components are frequently replaced without determining the root cause of that failure only to result in similar failures in the future.

The present invention addresses these problems by providing an on-board diagnostic system called a Vehicle Driveline Vibration Analyzer (VDVA) which can measure and monitor driveline torsional vibrations in order to provide an advanced warning that the vehicle requires service prior to any major component failures. In addition, the present vehicle driveline vibration analysis system is able to store gathered driveline vibration data and then analyze the stored information in order to help pinpoint the cause of vibration using an electronic control unit mounted on the vehicle.

The diagnostic system includes a means for measuring and recording cyclic speed variations in the vehicle's transmission output. Sensed speed variations are then correlated to driveline torsional vibrations using a simplified method so that computation overhead is minimized and existing on-board electronics can be utilized. Certain ranges of interest are filtered out and used to analyze and characterize the vibrations. A Total Torsional Energy level is calculated based on the filtered speed data by taking its root mean square over a selected period of time. Resulting Total Torsional Energy levels which exceed predefined limits are used to trigger a driver warning device or as input to a subsequent response means.

These and other features and advantages of the present invention will become apparent upon review of the following discussions taken in view of the accompanying drawings.

BRIEF DESCRIPTION OF THE DRAWINGS

FIG. 1 is a schematic illustration of the present invention as applied to a vehicle driveline.

FIG. 2 is a graphical representation of the signal produced by the magnetic speed sensor of the present VDVA.

FIG. 3 is a graphical representation of the signal produced by the magnetic speed sensor of the present VDVA as shown in FIG. 2 after optional TTL signal conditioning.

DETAILED DESCRIPTION OF THE PREFERRED EMBODIMENT

Figure 4:
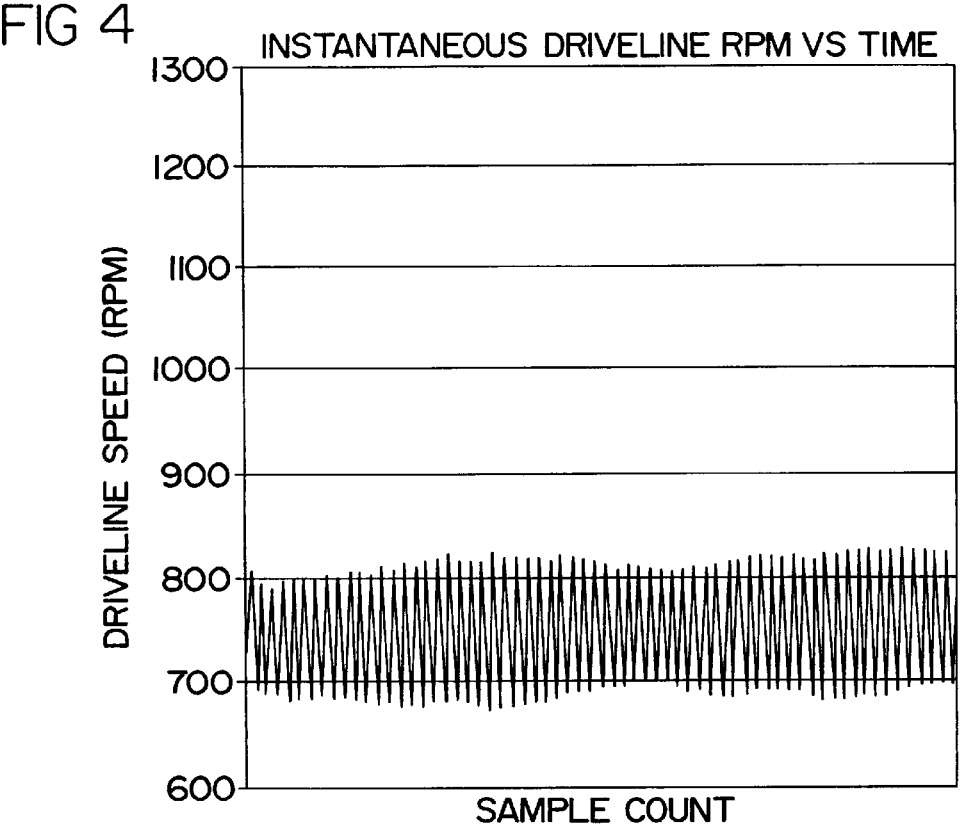
FIG. 4 is a graph of the calculated driveline speed verses time.

Turning now to the drawings, and in particular to FIG. 1, an on-board vehicle driveline vibration analyzer (VDVA) is indicated generally at 10. In FIG. 1 and by way of example a VDVA 10 is set up to measure torsional vibrations in a vehicle driveline which includes a transmission 12, engine 14 and other common components, in this exemplary schematic embodiment the driveline being of a heavy duty truck. While VDVA 10 will be described herein as adapted to measure and analyze torsional vibrations in a heavy duty truck driveline, it should become readily apparent that the present apparatus and method are equally well suited for implementation in other types of vehicles such as automobiles, light duty trucks and other equipment such as agricultural and construction vehicles and industrial rotating machinery equipment.

The VDVA 10 includes a microprocessor-based electronic control unit 20 which is electrically connected to a speed sensor 24. The speed sensor 24 measures the output shaft speed of the transmission 12 such as that normally provided or most modern class 8 truck transmissions. Sensor 24 provides a clean sixteen pulse per revolution, one pulse for each tooth on a sixteen toothed wheel which rotates with the output shaft of transmission 12 creating a sinusoidal tach signal 18, such as illustrated graphically in FIG. 2. Note that signal peaks 18a are created by a strong magnetic field occurring as a tooth passes near sensor 24, and valleys 18b are created when the sensor 24 is positioned between passing teeth. While sensor 24 measures rotational speed or velocity at the output of transmission 12, it is sensitive to all significant driveline torsionals which result in variations in the instantaneous rotational speed of the transmission output shaft. Although the transmission output location is typically not the point of highest torsional vibration in the driveline, it has been shown to be sufficiently torsionally active under both engine and universal joint excited vibration to accurately assess driveline torsional behavior.

Alternatively, however, any other suitable means could be provided for accurately measuring the rotational speed of a particular driveline component of interest. For instance, an alternate embodiment may include a similar magnetic sensor adapted to measure the rotational speed between passing teeth of a suitable test fixture affixed for test purposes to the particular driveline component of interest such as an input or output yoke of a vehicle transmission or drive axle. An optical sensor could also be used to indicate the passing of markings or indentations made on a particular rotating driveline component.

Sensor 24 is electrically coupled via connector 22 to the microprocessor-based electronic control unit 20 through signal conditioning unit 16 wherein various signal conditioning methodologies can be implemented which are well known in the art such as filtering, amplification or conversion into a TTL square wave type of signal. Note that the use of the signal conditioning unit 16 is optional depending on the capability of the electronic control unit 20 to accept signals directly from the sensor 24.

A sample TTL processing of the signal from the sensor 24 is shown in FIG. 3 as TTL signal 25 where the time Δt between square waves is used to calculate an instantaneous speed of the rotating component of interest. With the information provided by the series of Δt measurements obtained in the course of measuring and analyzing vibrations in a driveline under test, a number of analysis strategies are available, from fairly straight forward to complex. These analyses enable ECU 20 to detect the presence of destructive torsional vibration and warn the vehicle operator. This is preferably done in real time but alternately ECU 20 can simply store collected data in a convenient form for later processing or display. ECU 20, or a connected on-board or off-board microprocessor, can be further employed to analyze and extract certain signal components which are indicative of particular causes of torsional vibrations in the driveline. This can help maintenance personnel to eliminate trial and error vibration reduction repairs.

Figure 5:
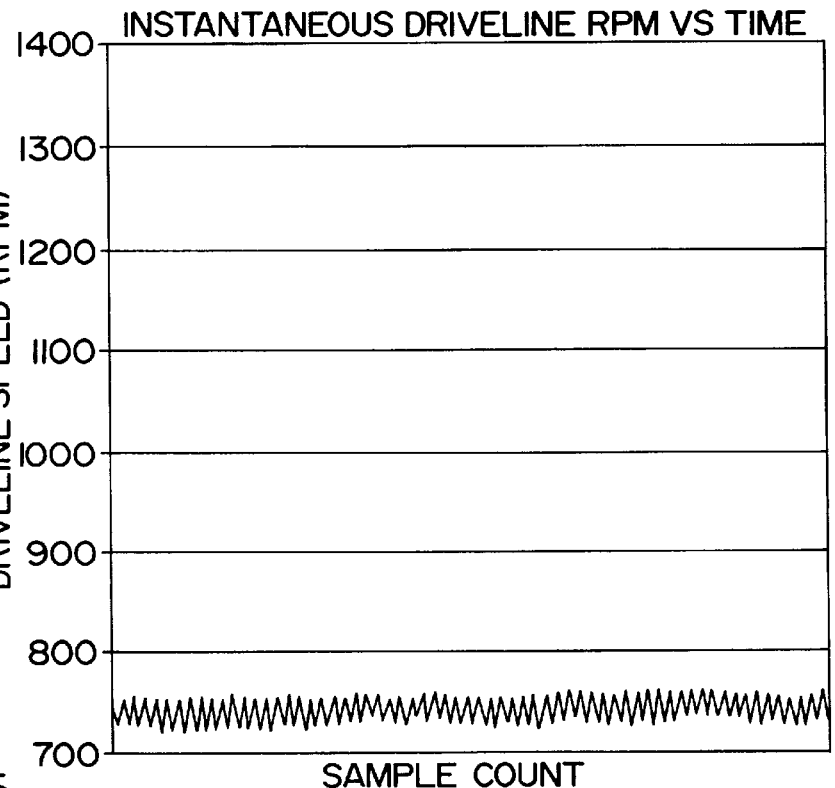
FIG. 5 is a graph similar to FIG. 4 of the same driveline after a soft clutch was installed to reduce the level of torsional vibration.

A first method of vibration analysis is preferably performed on-board by ECU 20 to detect potentially harmful vibrations. With this method, knowing how many teeth are on a particular transmission output gear being measured, the signal illustrated in FIGS. 4 and 5 are derived where FIG. 4 is a graph of the instantaneous speed of the output shaft and FIG. 5 is a similar graph except a soft clutch has been installed to lower the level of torsional vibration. From this signal, appropriate band pass filters, preferably digital filters implemented in software residing within ECU 20 can be employed to select particular frequencies of interest and to ignore frequencies out of that range.

VDVA 10 is able to calculate all driveshaft vibration orders up to one-half of the number of gear teeth. Therefore, VDVA 10 is sensitive to U-joint excited torsionals, which are constant second order in all transmission gears. Engine excited vibration can be analyzed in all transmission gears up to a maximum gear ratio equal to one-half of the number of teeth multiplied by the engine crankshaft vibration order of interest. For example, the fundamental engine firing order for a six cylinder 4-cycle engine is the third crankshaft order. With a sixteen tooth gear, VDVA 10 could thus analyze engine firing data in all gear ratios less than 2.67. Because engine excited torsionals are of greatest concern in the high range transmission gears, a sixteen tooth gear or wheel is thus adequate. In addition, the order resolution can be improved by increasing the size of the sample. For example, using the same gear and a sample size of 256 samples, the VDVA 10 will record 16 shaft rotations and can resolve torsional vibration to the nearest 1/16 order.

At each rotational order of the crankshaft, ECU 20 produces velocity magnitude data. From this velocity data, displacement and acceleration also be calculated in a manner well known to those having skill in the art.

The electronic control unit 20 is implemented permanently on-board the vehicle as a separate processor or, preferably, as part of the vehicle's engine or transmission electronic controller. Within the electronic control unit 20, the pulses produced by the sensor 24 are processed and the time period between each pulse is used to compute, among other parameters, the instantaneous speed of the transmission output shaft. It can be appreciated that at very high rotational speeds, this information is processed quite rapidly. Knowing that the angular displacement between two adjacent teeth is equal to $2\pi$ divided by the number of teeth, the angular velocity $d\theta/dt$ can be readily calculated.

A FFT (fast Fourier transform) can be used to process this information to go from the time domain to the frequency domain to be used as a basis for torsional vibration analysis. However, the FFT processing is expensive and computationally consuming and could not be effectively accomplished with the conventional on-board electronic control unit 20.

Figure 6:
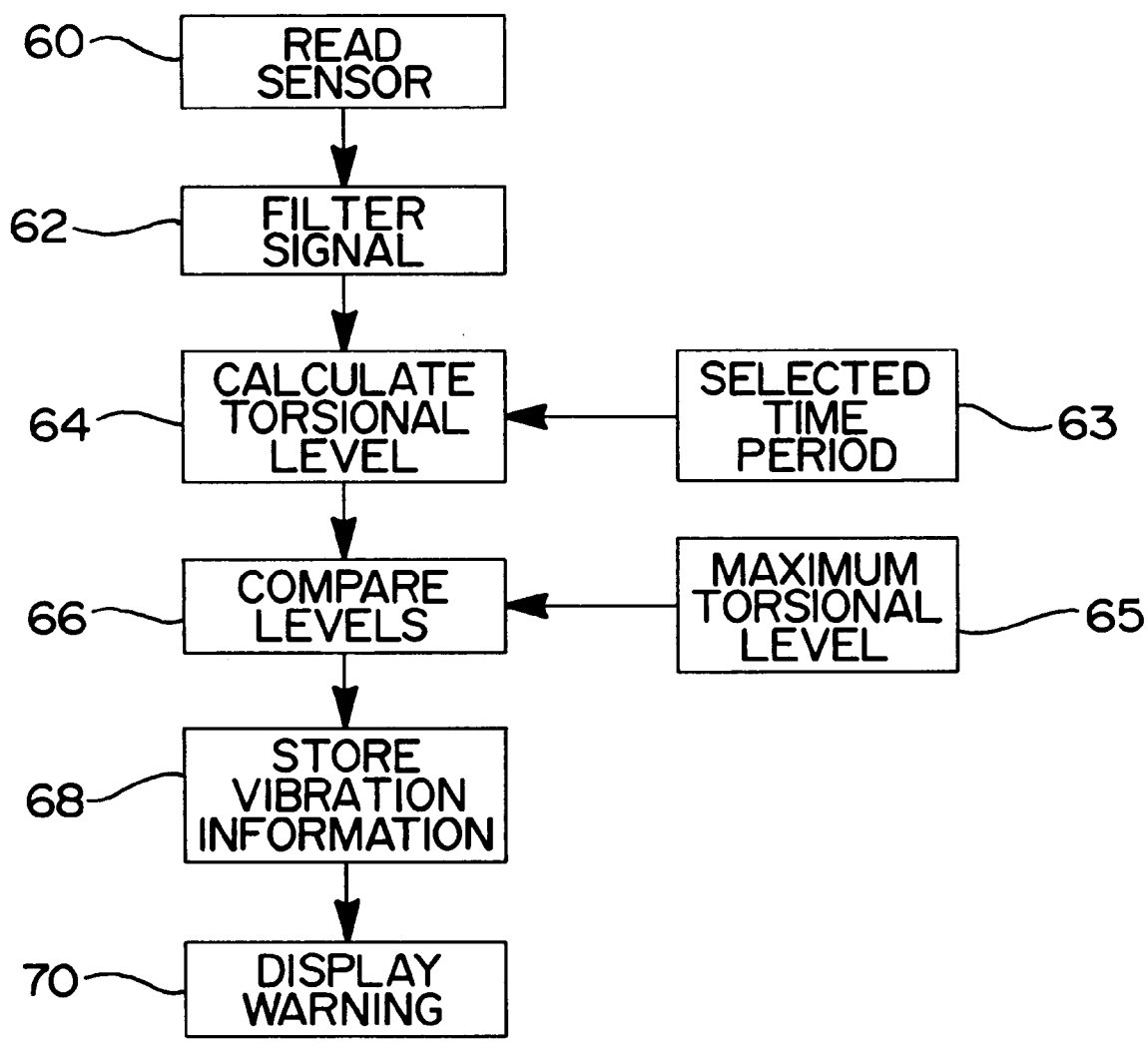
FIG. 6 is a block diagram illustrating the method of torsional vibration analysis of the present invention.

According to the present invention an alternative signal processing method to the FFT is used to identify vibrational levels that could prove damaging to the vehicular driveline. Referring to FIG. 6, a block diagram of the method used to analyze torsional vibration is shown. In block 60, the signal produced by the sensor 24 is connected directly or through the signal conditioning unit 16 into the electronic control unit 20 and the sensor 24 output is read by the electronic control unit 20. A speed algorithm converts the signal from the transmission output shaft speed sensor 24 to radians per second. In block 62 a software bandpass filter is then used to filter the signal according to the following filter Z transform equation:

$$H(Z) = \frac{0.2835 - 0.8504Z^{-2} + 0.8504Z^{-4} - 0.2835Z^{-6}}{1.0 - 0.7998Z^{-1} - 0.4725Z^{-2} + 0.1465Z^{-3} + 0.4725Z^{-4} - 0.0887Z^{-5} - 0.0732Z^{-6}}$$

This Butterworth bandpass filter is designed to pass torsional frequencies in the range of 1 to 6 orders of revolution with a roll-off rate of 60 dB per decade. In addition, the signal is separately low pass filtered to some very low frequency in order to define the average steady output shaft speed which is required for other calculations. Note that this filter equation is presented as an example and any other filtering strategies could be implemented according to the present invention. Additionally, the filter pass band frequencies can be either fixed or can be rotational order tracked. The frequency range of interest for this example is generally 25 $H_z$ to 100 $H_z$. Using the preferred order tracking approach, upon sensing each tooth, the following recursive equation is recalculated and a tracking pass band filter provides order tracking. This technique provides the advantage that the equation coefficients do not have to be changed with a change in the rotational speed of the driveshaft.

Digital implementation of the preceding filter equation is effectuated in a computer using the following recursive difference equation:

$$\text{Filtered Speed} = 0.7998U_{k-1} + 0.4725U_{k-2} - 0.1465U_{k-3} - 0.4725U_{k-4} + 0.0887U_{k-5} + 0.0732U_{k-6} + 0.2835i_k - 0.8504i_{k-2} + 0.8504i_{k-4} - 0.2835i_{k-6}$$

where $U_k$ is the filtered speed at time k and $U_{k-i}$ is the filtered speed at time k-i (the preceding calculation instant) and the $i_k$ terms are corresponding instantaneous measured-speeds from previous sample times. Again, the method presented to calculate the Filtered Speed values is by way of example only and any other strategy could be utilized according to the present invention.

The next step in the analysis according to the present invention is to calculate the total filtered vibrational energy also referred to as the Total Torsional Energy in a given segment of time which defines N, the number of calculated Filtered Speed samples for later comparison to a predetermined limit. The next software block performs an RMS (root mean square) summation of the total energy contained in the torsional vibration according to the following equation:

$$\text{Total Torsional Energy} = \sqrt{\sum_{i=1}^{N}\left(\frac{\text{Filtered Speed}}{N}\right)^2}$$

The Total Torsional Energy level is then compared to a predetermined limit. If that limit is exceeded, then the operator is warned that continued operation under those conditions could result in damage to the vehicle driveline due to a high level of torsional vibration.

In either case, a fixed time interval, one second in this exemplary embodiment, is selected. One skilled in the art will recognize that this could also be done in the form of fixed shaft rotation intervals. The net result in either case is an overall calculation of driveline torsional velocity. By integrating or differentiating the result mathematically prior to integrating power or prior to making the rms calculation, torsional displacements and accelerations can likewise be determined. If integration was performed, the running integral amplitude is compared with predetermined acceptable limits for the same time period. If rms is calculated the amplitude is compared to a different set of limits. This comparison is repeated over and over.

Electronic control unit 20 is adapted, upon determination of an out of range measurement, to do any of several things, all directed toward solving the apparent problem. For instance, an audio or visual warning may be provided to the driver in the vehicle cab. This could be accomplished via any one of many methods apparent to those having skill in the art such as via a hardwired light.

Various signals, conforming in characteristics and protocol, could alternately be sent to various other vehicle component controllers, such as over an interconnecting J1939 line. In such instances, this frequency information can be used by the other vehicle components, such as an engine, or even the transmission, to alter its operating characteristics in an effort to reduce or eliminate the sensed vibrations.

Alternately or additionally, all or some of the vibrational data obtained may be stored in a data logger, preferably electronic control unit 20 but any suitable memory device known to those having skill in the art, for later diagnostic use and/or for historical record keeping purposes. This data could be stored in any of a number of forms, such as in histogram form relative to amplitude, by frequency of occurrences or could be the number of frequency occurrences. Any other suitable data format useful to those of skill in the art could alternately be implemented.

Driveline torsional activity can be treated in several ways including reducing the amplitude of the excitation source, shifting the resonant speed below the engine's operating range or providing sufficient driveline damping to attenuate torsional response. The preferred treatment is dependent upon the nature of the problem. By using VDVA 10 to identify the source of vibration, the appropriate remedy can be selected.

In summary, the VDVA 10 consists of an electronic control unit capable of processing the signal from a sensor 24 generated from a plurality of equally spaced teeth rotating with the transmission output shaft. By measuring the time between each consecutive tooth the electronic control unit calculates a measure of instantaneous driveline velocity. The velocity signal is then digitally band-pass filtered to yield only torsional vibration data in the frequency range of interest. Finally, the electronic control unit computes the overall power or average RMS amplitude of the filtered velocity data and calculates the Total Torsional Energy over a specific time period. The result is then compared to a predetermined limit and if the result exceeds that limit the operator is notified of possible driveline damage. This is best illustrated with reference to FIG. 6 which is a block diagram of the method of torsional analysis according to the present invention. Block 60 illustrates the process of acquiring the rotational information from the sensor 24 which can include signal conditioning to convert the signal from the sensor 24 into a TTL format. Block 62 illustrates the process of filtering the rotational information to isolate the information in the frequency range of interest using hardware or software filtering. Block 64 illustrates the process of calculating a total torsional energy level for the selected time period illustrated in block 63. Block 66 illustrates the process of comparing the total torsional energy level to a preselected maximum torsional level as illustrated in block 65. If the total torsional energy level exceeds the maximum torsional level, then a warning signal is generated and communicated to an operator as graphically illustrated by block 68. In addition, or as an alternative to a graphical display, the information generated by the VDVA 10 can be stored in memory. Information such as frequency of occurrence of high torsional amplitudes along with duration, engine speeds and/or the operational mode of the transmission during periods of high level vibrations, etc. can be stored in the VDVA 10 for access by an external processing unit.

The VDVA 10 thus provides a convenient and simple solution to identify a vehicle vibrations problem. Excess torsional vibration can be identified in order to eliminate expensive driveline repair. VDVA 10 is configured to allow a vehicle to be continuously tested and the results analyzed in almost real time thereby minimizing vehicle damage. Additionally, VDVA 10 can also be used as an engineering tool in conjunction with auxiliary instrumentation to study torsional vibration in vehicle drivelines for use in driveline design as well as input to engine and transmission control algorithms.

The foregoing discussion discloses and describes an exemplary embodiment of the present invention. One skilled in the art will readily recognize from such discussion, and from the accompanying drawings and appended claims, that certain changes, modifications and variations can be made therein without departing from the spirit and scope of the invention as defined by the following claims.

We claim:

1. A tool for measuring and analyzing the operation of a rotating component comprising:

a sensor for generating a signal having a frequency proportional to the substantially instantaneous speed of a driveline component under test;

a electronic control unit electrically coupled to said sensor for receiving said signal, said control unit including means for filtering said signal into a filtered signal and calculating the total torsional energy by taking the root mean square of said filtered signal over a predetermined period of time and comparing said total torsional energy level to a predetermined maximum level and storing vibration information in a memory section of said electronic control unit.

2. The tool of claim 1, wherein said sensor measures the rotational speed between pairs of evenly spaced adjacent indications on a rotating driveline component.

3. The tool of claim 1, wherein said vehicle driveline includes a transmission and said sensor generates said signal based on the rotational speed of an output shaft of said transmission.

4. The tool of claim 3, wherein said electronic control unit also controls said transmission.

5. The tool of claim 1, further comprising a display electrically connected to said electronic control unit for signaling an operator when said total torsional energy exceeds said maximum level.

6. The tool of claim 1, wherein said electronic control unit also controls an engine.

7. The tool of claim 1, where said filtering means is a band pass filter.

8. The tool of claim 1, where said filtering means is tracked by rotational order.

9. A method of measuring and analyzing the operating of a rotating component comprising the steps of:

measuring the rotational speed characteristics of a rotating component and generating a signal having a frequency proportional to the substantially instantaneous speed of said rotating component;

filtering said signal into a filtered signal where said filtered signal has a frequency content between a first order of rotation and a higher order of rotation;

calculating a total torsional energy value by taking the root mean square of said filtered signal over a preselected period of time;

comparing said total torsional energy value to a preselected maximum value and if said total torsional energy value exceeds said preselected maximum then storing vibration information in memory.

10. A method of claim 9, wherein said rotating component is a component of a vehicle driveline.

11. The method of claim 10, wherein said rotating component is an output shaft of a transmission.

12. The method of claim 9, wherein said high order of rotation is the sixth order of rotation.

13. The method of claim 9, wherein said rotating component is a transmission output shaft and the rotational speed characteristics of said rotating component is measured using a non-contact magnetic sensor.

14. The method of claim 9, wherein the filtering of said signal is performed using a Butterworth filter.

* * * * *